United States Patent
Fujimoto et al.

(10) Patent No.: US 7,916,760 B2
(45) Date of Patent: Mar. 29, 2011

(54) PACKET SENDING APPARATUS AND PACKET TRANSMISSION SYSTEM

(75) Inventors: Koki Fujimoto, Fukuoka (JP); Nobuyuki Iwasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 595 days.

(21) Appl. No.: 11/706,209

(22) Filed: Feb. 15, 2007

(65) Prior Publication Data

US 2007/0189305 A1 Aug. 16, 2007

(30) Foreign Application Priority Data

Feb. 15, 2006 (JP) ................. 2006-037411

(51) Int. Cl.
*H04J 3/06* (2006.01)
(52) U.S. Cl. ............... 370/516; 370/395.21; 370/395.4; 370/506; 375/372
(58) Field of Classification Search ............ 375/372; 370/395.21, 395.4
See application file for complete search history.

(56) References Cited

U.S. PATENT DOCUMENTS

| | | | | |
|---|---|---|---|---|
| 4,575,860 A | * | 3/1986 | Scordo | 375/361 |
| 6,377,645 B1 | * | 4/2002 | Chen et al. | 375/372 |
| 2003/0161321 A1 | * | 8/2003 | Karam et al. | 370/395.21 |
| 2004/0156367 A1 | * | 8/2004 | Albuquerque et al. | 370/395.4 |
| 2004/0170182 A1 | | 9/2004 | Higashida et al. | |

* cited by examiner

*Primary Examiner* — Jason E Mattis
*Assistant Examiner* — Joey Bednash
(74) *Attorney, Agent, or Firm* — Fujitsu Patent Center (57) ABSTRACT

A packet sending apparatus that improves packet transmission quality by preventing loss of packet information, while minimizing a reduction in transmission rate. A clock frequency deviation correction calculation section calculates a valid packet sending period in which valid packets packet information of which is not lost due to clock frequency deviation between the packet sending apparatus and a packet receiving apparatus are included and the number of valid packets included in the valid packet sending period. A packet sending section exercises priority control by determining whether a packet to be sent is a priority packet or a non-priority packet and by sending a priority packet in preference to a non-priority packet, and performs a packet sending process on a packet to be corrected other than the valid packets completely included in the valid packet sending period at the time of correcting the clock frequency deviation by inserting a packet gap corresponding to a sending stop period for which packet sending is stopped to prevent loss of packet information.

13 Claims, 6 Drawing Sheets

PACKET SENDING APPARATUS AND PACKET TRANSMISSION SYSTEM

CROSS-REFERENCE TO RELATED APPLICATIONS

This application is based upon and claims the benefits of priority from the prior Japanese Patent Application No. 2006-037411, filed on Feb. 15, 2006, the entire contents of which are incorporated herein by reference.

BACKGROUND OF THE INVENTION (1) Field of the Invention

This invention relates to a packet sending apparatus and a packet transmission system and, more particularly, to a packet sending apparatus for sending packets by priority control and a packet transmission system for transmitting packets by priority control between a sending apparatus and a receiving apparatus between which clock frequency deviation exists.

(2) Description of the Related Art

In recent years communication services provided on the basis of Ethernet (registered trademark) or the like by using internet protocol (IP) packets have developed remarkably. One of main communication services employs priority control. With the priority control, high priority packets are sent in preference to non-priority packets. That is to say, services in which communication quality discrimination is exercised are provided.

Traffic which always passes through, for example, corporate networks includes various pieces of information, such as mails sent and files transferred. Accordingly, if other pieces of information, such as voice packets sent by IP telephony, are added to this traffic, voice may be hard to listen to at the other end. In such cases, the priority control should be used. By doing so, voice packets are placed into a top priority class and are sent to the other end in preference to the other information packets. As a result, deterioration in voice quality can be prevented.

When a packet sending apparatus having a priority packet sending function receives packets, the packet sending apparatus determines the priorities of the packets and places and stores the packets in internal queues or the like according to their priorities. The packet sending apparatus then sends the packets stored in the internal queues in descending order of priority of queue.

Conventionally, a technique for making intervals at which priority packets are sent shorter than the average sending interval and for sending non-priority packets by using the remaining time given is proposed as a technique for transmitting packets (see, for example, WO 2003/017577 (paragraphs [0117] to [0119] and FIG. 1).

A packet sending apparatus and a packet receiving apparatus each have their clock sources. Signal provisions which comply with the IEEE802.3 standard permit packet transmission between a packet sending apparatus and a packet receiving apparatus at (frequency of each clock source) ±100 p.p.m (p.p.m=$1/1,000,000$). Accordingly, in packet transmission between a packet sending apparatus and a packet receiving apparatus, packet information may be lost due to clock frequency deviation between the packet sending apparatus and the packet receiving apparatus (if the speed of a clock source of the packet sending apparatus is high and the speed of a clock source of the packet receiving apparatus is low). Usually loss of packet information due to clock frequency deviation is permitted by the standard and is originally hopeless. If priority control is exercised in such a sending-receiving system, information included in a priority packet may be lost.

In this case, it is possible to prevent loss of packet information by merely lowering the output rate of the packet sending apparatus. However, this method lowers a transmission rate at a fixed rate. Usually a receiving buffer is located on the packet receiving apparatus side. As a result, the discard of packet information corresponding to clock frequency deviation can be prevented for a certain period of time. Furthermore, the receiving buffer can absorb variation in the amount of data transmitted (the packet sending apparatus does not always perform transmission at the highest transmission rate (full wire rate)). If the transmission rate of the packet sending apparatus is lowered with the clock frequency deviation taken into consideration, the efficiency of transmission in the entire system decreases.

Loss of packet information caused by the clock frequency deviation occurs randomly. This means that regardless of whether a packet sent by the packet sending apparatus is a priority packet or a non-priority packet (packet in, for example, best effort service for which a band is not guaranteed), information included in the packet is lost. If such a situation occurs, the packet sending apparatus which exercises priority control becomes meaningless.

SUMMARY OF THE INVENTION

The present invention was made under the background circumstances described above. An object of the present invention is to provide a packet sending apparatus which improves packet transmission quality by preventing loss of packet information caused by clock frequency deviation, while minimizing a reduction in transmission rate.

Another object of the present invention is to provide a packet transmission system which improves packet transmission quality by preventing loss of packet information caused by clock frequency deviation, while minimizing a reduction in transmission rate.

In order to achieve the above first object, there is provided a packet sending apparatus for performing packet sending. This packet sending apparatus comprises a clock frequency deviation correction calculation section for calculating a valid packet sending period in which valid packets packet information of which is not lost due to clock frequency deviation between the packet sending apparatus and a packet receiving apparatus are included and the number of valid packets included in the valid packet sending period and a packet sending section for exercising priority control by determining whether a packet to be sent is a priority packet or a non-priority packet and by sending a priority packet in preference to a non-priority packet, and for performing a packet sending process on a packet to be corrected other than the valid packets completely included in the valid packet sending period at the time of correcting the clock frequency deviation by inserting a packet gap corresponding to a sending stop period for which packet sending is stopped to prevent loss of packet information.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
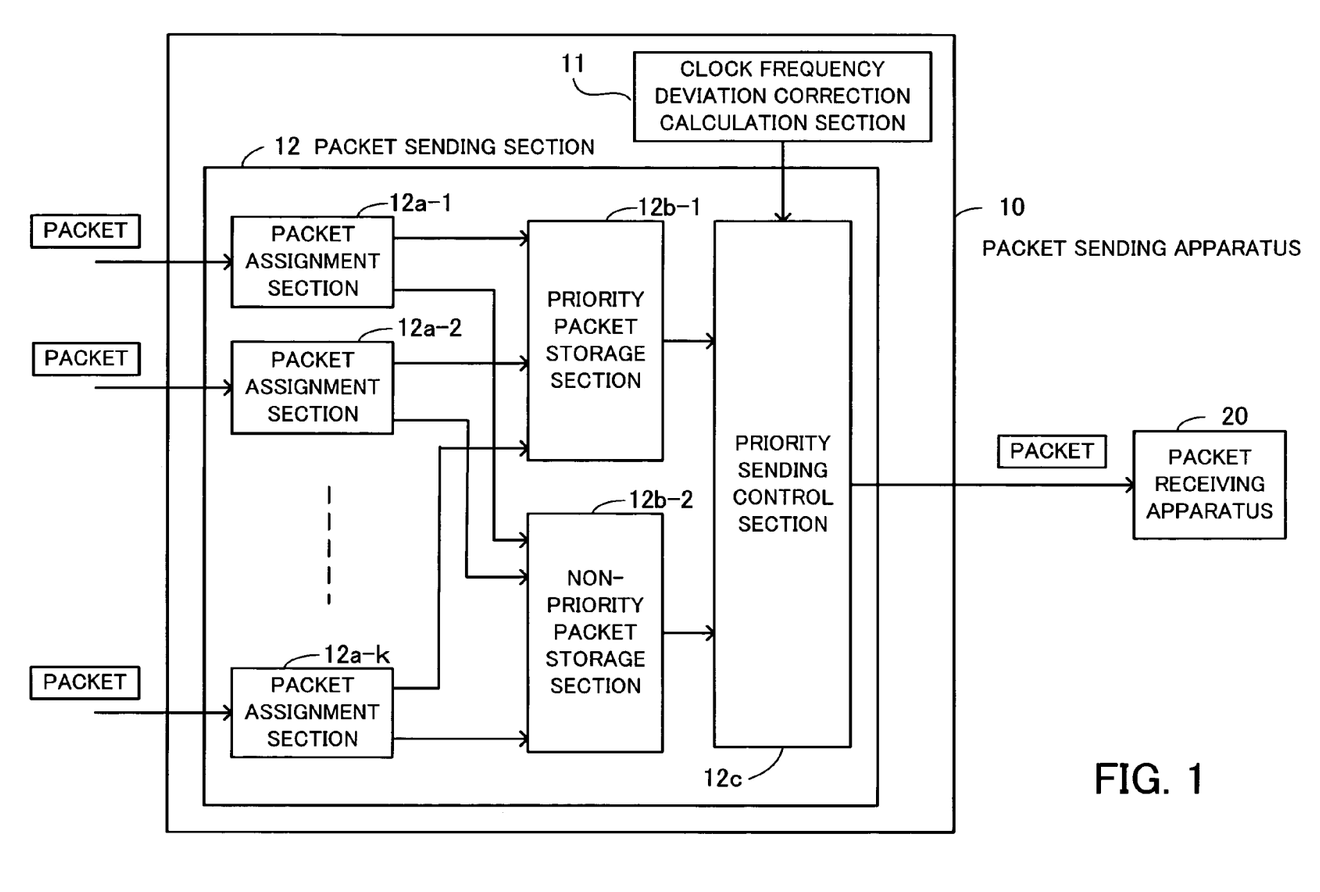
FIG. 1 is a view for describing the principles of a packet sending apparatus according to the present invention.

Embodiments of the present invention will now be described with reference to the drawings. FIG. 1 is a view for describing the principles of a packet sending apparatus according to the present invention. A packet sending apparatus 10 sends packets on the basis of priority control.

The packet sending apparatus 10 comprises a clock frequency deviation correction calculation section 11 and a packet sending section 12. The clock frequency deviation correction calculation section 11 calculates a valid packet sending period in which valid packets packet information of which is not lost due to clock frequency deviation between the packet sending apparatus and a packet receiving apparatus are included and the number of valid packets sent in the valid packet sending period (details will be described later).

The packet sending section 12 includes packet assignment sections 12a-1 through 12a-k, a priority packet storage section 12b-1, a non-priority packet storage section 12b-2, and a priority sending control section 12c. The packet sending section 12 exercises priority control by determining whether a packet to be sent is a priority packet or a non-priority packet and by sending a priority packet in preference to a non-priority packet.

The packet assignment sections 12a-1 through 12a-k are each provided for a port. Each of the packet assignment sections 12a-1 through 12a-k determines whether a packet it received is a priority packet or a non-priority packet. If the packet is a priority packet, the packet is sent to the priority packet storage section 12b-1. If the packet is a non-priority packet, the packet is sent to the non-priority packet storage section 12b-2. The priority packet storage section 12b-1 stores the priority packet sent thereto. The non-priority packet storage section 12b-2 stores the non-priority packet sent thereto.

When a priority packet is stored in the priority packet storage section 12b-1, the priority sending control section 12c reads out the priority packet from the priority packet storage section 12b-1 and exercises control for sending the priority packet to a packet receiving apparatus 20 in preference to a non-priority packet. When a priority packet is not stored in the priority packet storage section 12b-1, the priority sending control section 12c reads out a non-priority packet from the non-priority packet storage section 12b-2 and exercises control over the best effort sending of the non-priority packet to the packet receiving apparatus 20.

When the priority sending control section 12c exercises control over sending the priority packet, the priority sending control section 12c performs a packet sending process on a packet to be corrected other than valid packets completely included in a valid packet sending period at the time of correcting clock frequency deviation by inserting a packet gap (data non-sending interval in which data is not included) corresponding to a sending stop period for which packet sending is stopped to prevent loss of packet information.

The operation of a packet sending apparatus 10 according to a first embodiment of the present invention will now be described in detail. It is assumed that an interface between the packet sending apparatus 10 and a packet receiving apparatus 20 performs Ethernet packet transmission at a transmission rate of k bps in accordance with the IEEE802.3 standard and that specifications for clocks of the packet sending apparatus 10 and the packet receiving apparatus 20 are as follows (usually the term "frame" is used for Ethernet, but in this specification the term "packet" is used for term standardization).

(Packet Sending Apparatus 10)
clock source: (k+f(p.p.m)) (Hz) (deviation of the sending processing clock included in the packet sending apparatus 10 is f(p.p.m))

(Packet Receiving Apparatus 20)
clock source: (k+g(p.p.m)) (Hz) (deviation of the receiving processing clock included in the packet receiving apparatus 20 is g(p.p.m))

It is assumed that an interval in which loss of s-bit data occurs due to clock frequency deviation is L (clk) (1 bit=1 clk). The clock differential $\delta$ between the packet sending apparatus 10 and the packet receiving apparatus 20 is (f−g) (p.p.m). Therefore, this clock differential is converted into a transmission rate and L is given by equation (1c).

$$(1/k) \times \delta \text{ (p.p.m)} = 1/L \tag{1a}$$

$$1/L = (1/k) \times (f-g)(\text{p.p.m}) \tag{1b}$$

$$L = k/(f-g) \times 10^{-6} \tag{1c}$$

When the packet sending apparatus 10 transmits L bits, the rate of the receiving clock of the packet receiving apparatus 20 is (L−s) (clk). As a result, loss of s-bit data occurs due to the clock frequency deviation. Accordingly, when the packet sending apparatus 10 transmits L bits, a sending stop period is set to s.

It is assumed that the number of bits included in one packet is m. If a receiving buffer (which receives data corresponding to $\alpha$ clocks and changes a clock to be used) is not provided on the packet receiving apparatus 20 side, then the number of valid packets that are included in a valid packet sending period is the quotient of (L−s)/m. The packet sending apparatus 10 performs a packet sending process on a packet to be corrected other than the valid packets at the time of correcting the clock frequency deviation by inserting a packet gap corresponding to the sending stop period s.

If a receiving buffer (which receives data corresponding to $\alpha$ clocks and changes a clock to be used) is located on the packet receiving apparatus 20 side, then the number of valid packets that are included in a valid packet sending period is the quotient of ((L−s)+$\alpha$)/m. The packet sending apparatus 10 performs a packet sending process on a packet to be corrected other than the valid packets at the time of correcting the clock frequency deviation by inserting a packet gap corresponding to the sending stop period s.

Descriptions will now be given by using concrete numeric values. It is assumed that the interface between the packet sending apparatus 10 and the packet receiving apparatus 20 performs Ethernet packet transmission at a frequency of 1 GHz in accordance with the IEEE802.3 standard. In addition, it is assumed that the frequency deviation of the sending processing clock of the packet sending apparatus 10 is +100 p.p.m and that the frequency deviation of the receiving processing clock of the packet receiving apparatus 20 is −100 p.p.m. Then the maximum value of the clock frequency deviation is 200 p.p.m.

First, a clock frequency deviation calculation section 11 converts a clock correction frequency deviation of 200 p.p.m into a transmission rate. In this case, (1/1 GHz)×200 p.p.m=1/5,000,000=1/5 M. This means that the number of clocks which are generated by the receiving processing clock of the packet receiving apparatus 20 while the packet sending apparatus 10 is transmitting 5,000 bits is 4,999.

First, the case where the packet receiving apparatus 20 does not include a receiving buffer which prevents loss of data corresponding to α clocks will be described. 5,000 bit data is transmitted from the sending side and the data is processed on the receiving side by 4,999 clocks. As a result, data corresponding to 1 bit cannot be processed and is discarded.

Therefore, each time the packet sending apparatus 10 transmits 4,999 bits, a sending stop period corresponding to 1 bit should be set. By doing so, the amount of valid data sent from the packet sending apparatus 10 is 4,999 bits. This is the same as the amount of data (4,999 bits) which the packet receiving apparatus 20 processes by using 4,999 processing clocks. That is to say, loss of packet information does not occur. Accordingly, adjustment should, be made by separating packets by a distance of +1 clock. By doing so, the clock frequency deviation can be corrected.

If the length of one packet is m bits (excluding a gap period), the number (=a) of valid packets is calculated by $$(4{,}999/m) = a \text{ (packets) with remainder of } b \text{ (bits)} \quad (2)$$

Therefore, after a packet sending section 12 sends a packets, the packet sending section 12 inserts a sending stop period corresponding to 1 clock before the (a+1)th packet as a packet gap.

Figure 2A:
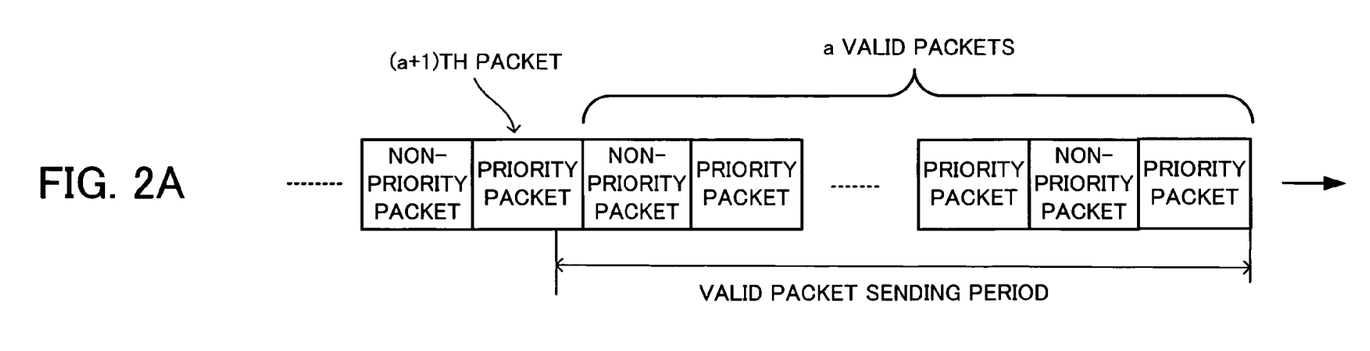
FIGS. 2A and 2B are views showing how packet transmission is performed, FIG. 2A being a view showing how packet transmission is performed in the case of clock frequency deviation not being corrected, FIG. 2B being a view showing how packet transmission is performed in the case of clock frequency deviation being corrected.
Figure 2B:
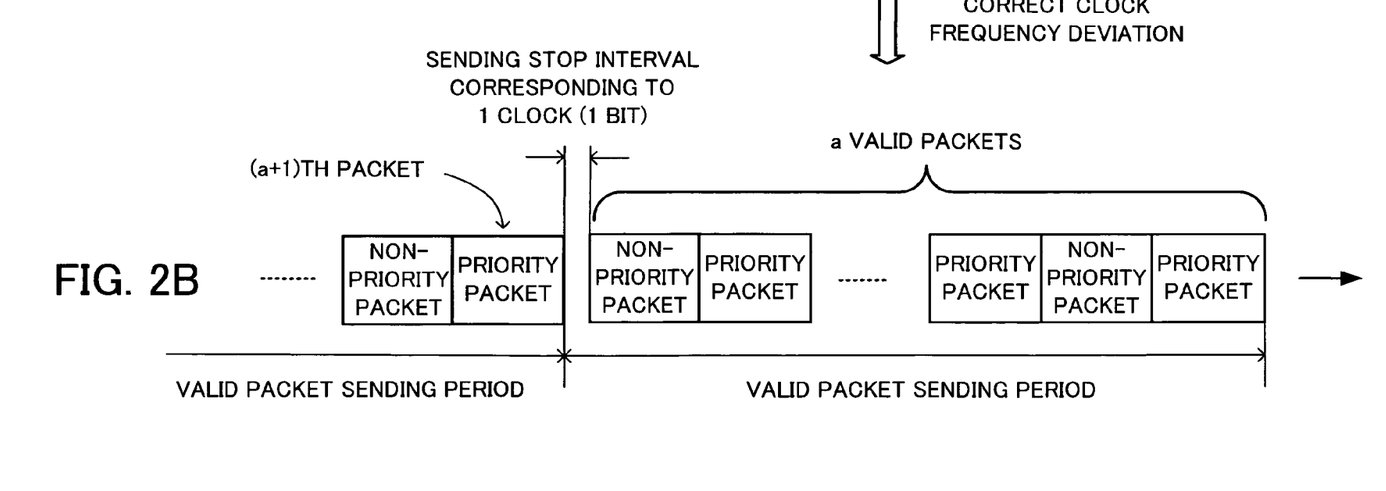

FIGS. 2A and 2B are views showing how packet transmission is performed. FIG. 2A is a view showing how packet transmission is performed in the case of clock frequency deviation not being corrected. FIG. 2B is a view showing how packet transmission is performed in the case of clock frequency deviation being corrected.

In FIG. 2A, a valid packets including priority packets and non-priority packets flow in a valid packet sending period. All of the a valid packets (including priority packets and non-priority packets) completely included in the valid packet sending period are normally received by the packet receiving apparatus 20 and loss of packet information caused by the clock frequency deviation does not occur.

However, part ((m−b(=remainder in equation (2))) bits) of the (a+1)th packet is outside the valid packet sending period. Accordingly, information included in this packet is lost due to the clock frequency deviation. If the (a+1)th packet is a non-priority packet, loss of the packet information can be considered to be permissible. However, if the (a+1)th packet is a priority packet, then communication quality deteriorates.

In FIG. 2B, the clock frequency deviation correction calculation section 11 informs the packet sending section 12 that the number of valid packets is a. Accordingly, the packet sending section 12 inserts a packet gap corresponding to a sending stop period (1 clock (1 bit), in this example) before the (a+1)th packet. A valid packet sending period is set again from the head of the (a+1)th packet. After that the same process is repeated. Loss of packet information caused by clock frequency deviation can be prevented by exercising the above control.

The packet sending apparatus 10 inserts a sending stop period calculated in advance before a first priority packet sent at the beginning of operation. In packet transmission performed after that, the packet sending apparatus 10 sets valid packet sending periods and sending stop periods in a way like that shown in FIG. 2B with the head of the first priority packet as a basis. By doing so, clock frequency deviation is corrected.

Next, the case where the packet receiving apparatus 20 includes a receiving buffer which prevents loss of data corresponding to α clocks will be described. If the length of one packet is m bits (excluding a gap period), the number (=c) of valid packets is calculated by $$(4{,}999+\alpha)/m = c \text{ (packets) with remainder of } d \text{ (bits)} \quad (3)$$

A receiving buffer amount of 1 bit can soak up the clock frequency deviation caused by transmitting 5,000 t data. If a receiving buffer amount is e bits, then $$\alpha = 4{,}999 \times e \quad (4)$$

By substituting equation (4) in equation (3), the following equation is obtained.

$$4{,}999(1+e)/m = c \text{ (packets) with remainder of } d \text{ (bits)} \quad (5)$$

The number of valid packets sent in a valid packet sending period may be calculated by equation (5).

Therefore, if the packet receiving apparatus 20 includes a receiving buffer which prevents loss of data corresponding to α clocks, the number (c) of valid packets is recognized from equation (3) or (5) and a packet gap corresponding to a sending stop period is inserted before the (c+1)th packet. However, this applies to a period corresponding to α clocks. After the elapse of the period corresponding to α clocks, the receiving buffer is already used (if data is inputted at a full rate). Accordingly, equation (2) is used for calculating a period after which the next gap corresponding to +1 clock is inserted. A gap corresponding to +1 clock is inserted before the (a+1)th packet. After that the same process is repeated.

A packet sending apparatus 10 according to a second embodiment of the present invention will now be described. With the packet sending apparatus 10 according to the first embodiment of the present invention, the valid packet sending period including the a valid packets ends and a packet gap corresponding to a sending stop period is inserted before the (a+1)th packet. By doing so, clock frequency deviation is corrected. In this case, a distinction is not drawn between priority packets and non-priority packets. That is to say, loss of packet information caused by clock frequency deviation is prevented for any packet. However, loss of packet information included in a non-priority packet is permitted. Therefore, the packet sending apparatus 10 according to the second embodiment of the present invention exercises control for permitting loss of packet information included in a non-priority packet to some extent and for reliably preventing loss of packet information included in a priority packet.

Figure 3:
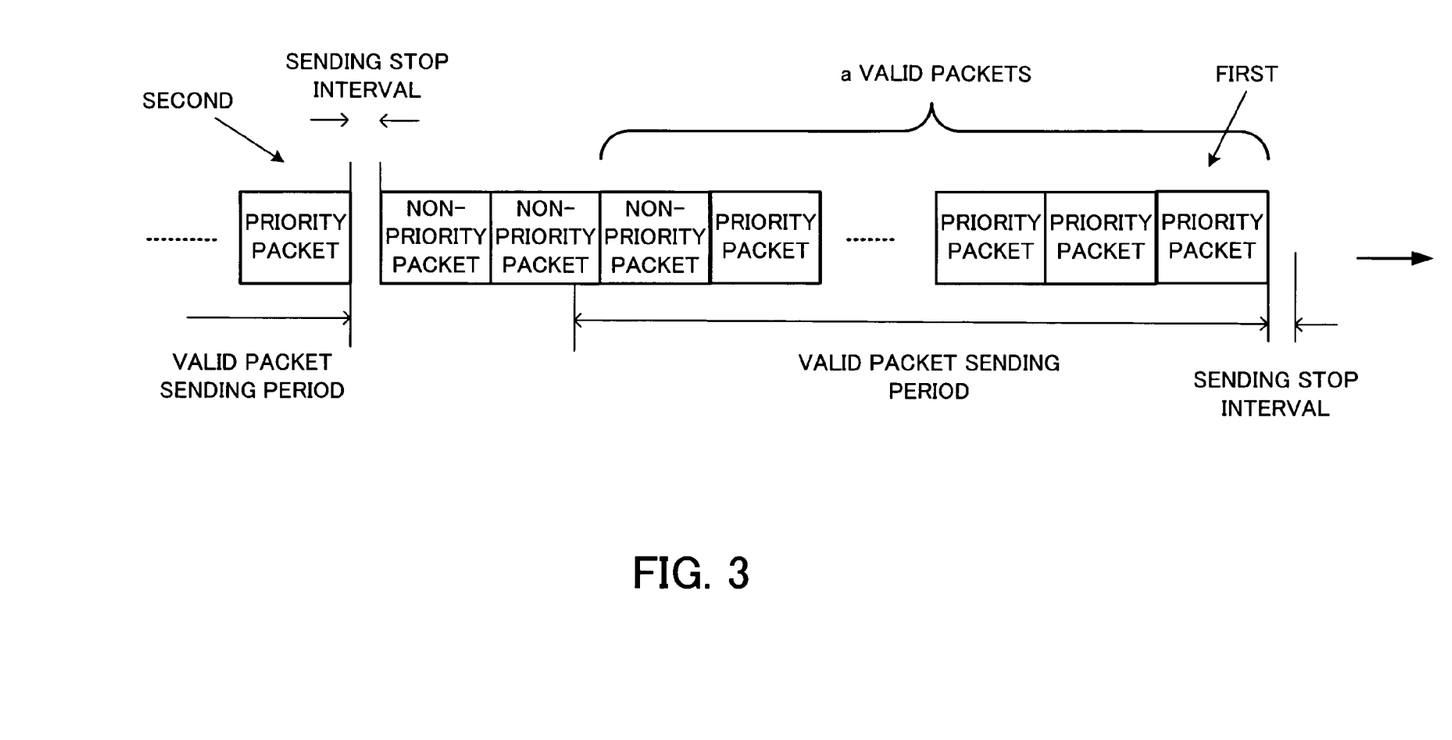
FIG. 3 is a view showing the operation of preventing loss of packet information included in a priority packet.

FIG. 3 is a view showing the operation of preventing loss of packet information included in a priority packet.

It is assumed that first through Nth priority packets are sent. A packet sending section 12 inserts a sending stop period before the first priority packet sent at the beginning of operation, and performs packet transmission by ordinary priority control for a valid packet sending period from the head of the first priority packet (naturally, loss of packet information does not occur for any packet sent in the valid packet sending period).

The packet sending section 12 then inserts a sending stop period before a priority packet (second priority packet in FIG. 3) which is first sent after the elapse of the valid packet sending period, and performs packet transmission by ordinary priority control for a valid packet sending period from the head of the second priority packet. The packet sending section 12 repeatedly exercises such control over the first through Nth priority packets.

As a result, as can be seen from FIG. 3, there is a possibility that loss of packet information caused by clock frequency deviation occurs in an interval from the time when the valid packet sending period ends to the time when the second priority packet is sent. However, only non-priority packets flow in this interval, so loss of packet information may occur. Loss of packet information is reliably prevented for the priority packets.

A packet sending apparatus 10 according to a third embodiment of the present invention will now be described. With the packet sending apparatus 10 according to the first or second embodiment of the present invention, there is a possibility that priority packets and non-priority packets are sent in a valid packet sending period. With the packet sending apparatus 10 according to the third embodiment of the present invention, however, valid packets sent in a valid packet sending period are all priority packets.

Figure 4:
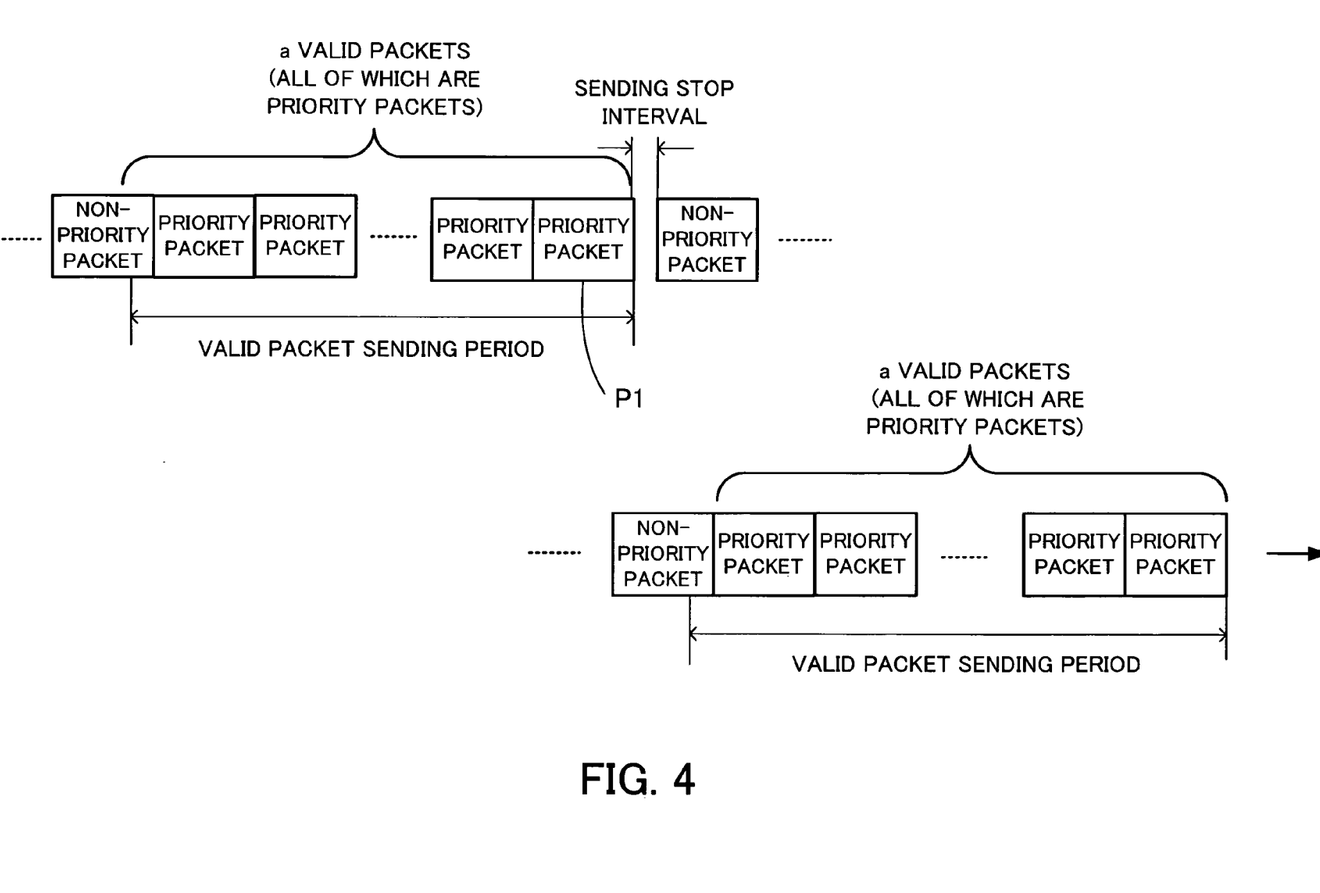
FIG. 4 is a view showing the operation of sending priority packets in a valid packet sending period.

FIG. 4 is a view showing the operation of sending priority packets in a valid packet sending period. A packet sending section 12 takes priority packets the number of which is included in a valid packet sending period out of a section storing priority packets, and sends the priority packets in succession in the valid packet sending period (that is to say, a priority sending control section 12c takes priority packets the number of which is included in the valid packet sending period out of a priority packet storage section 12b-1 and sends the priority packets in succession).

When the packet sending section 12 first sends a priority packet (indicated by P1 in FIG. 4) after the elapse of the valid packet sending period, the packet sending section 12 inserts a sending stop period before the first priority packet P1 and sends priority packet again in succession in a valid packet sending period from the head of the first priority packet P1. Valid packets sent in a valid packet sending period are not influenced by clock frequency deviation. Therefore, by making all of the valid packets sent in the valid packet sending period priority packets, loss of packet information can be prevented for the priority packets.

Figure 5:
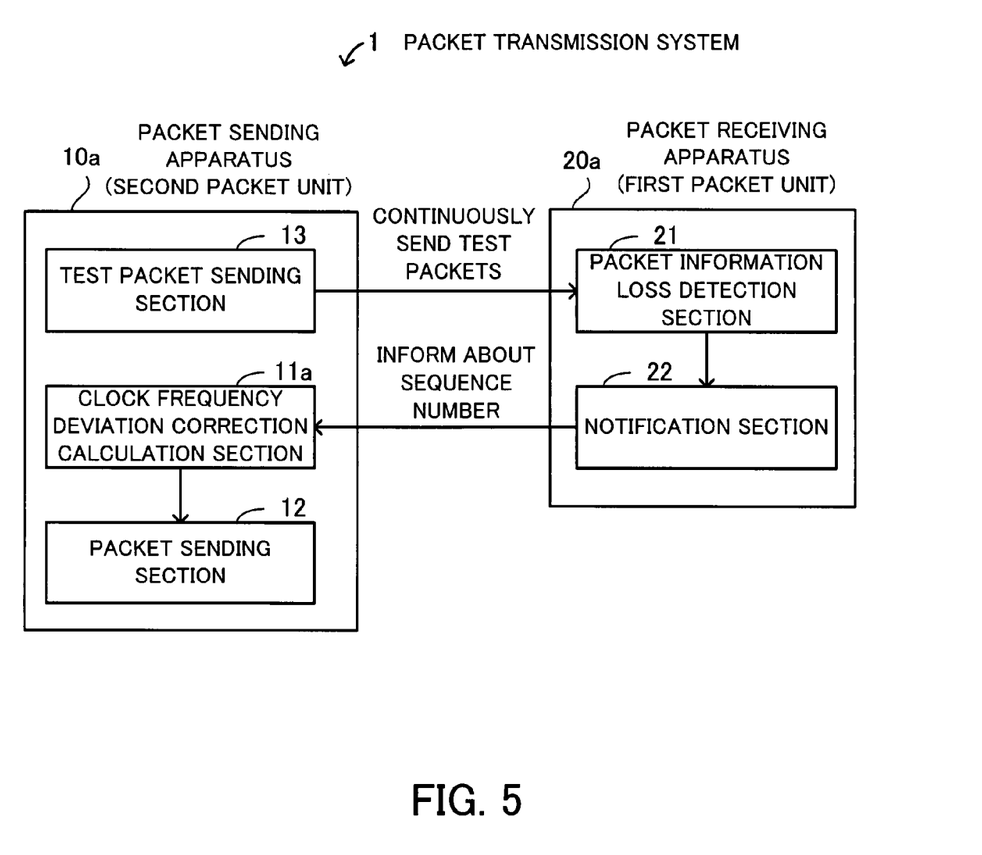
FIG. 5 shows the structure of a packet transmission system according to the present invention.

A packet transmission system according to the present invention will now be described. FIG. 5 shows the structure of a packet transmission system according to the present invention. A packet transmission system 1 comprises a packet sending apparatus 10a and a packet receiving apparatus 20a and performs packet transmission under priority control between the packet sending apparatus 10a and the packet receiving apparatus 20a between which clock frequency deviation exists.

The packet receiving apparatus 20a (corresponding to a first packet unit) includes a packet information loss detection section 21 and a notification section 22. The packet information loss detection section 21 continuously receives test packets in each of which a sequence number is added to header information, and detects a sequence number of a test packet information of which is lost due to clock frequency deviation. The notification section 22 informs the packet sending apparatus 10a about the sequence number of the test packet the information of which is lost.

The packet sending apparatus 10a (corresponding to a second packet unit) includes a clock frequency deviation correction calculation section 11a, a packet sending section 12 (which is the same as that shown in FIG. 1), and a test packet sending section 13. At the beginning of system operation the test packet sending section 13 generates test packets in each of which sequence number is added to header information, and continuously sends the test packets to the packet receiving apparatus 20a.

The clock frequency deviation correction calculation section 11a recognizes a valid packet sending period in which valid packets information of which is not lost exist from the sequence number about which the packet receiving apparatus 20a informs the clock frequency deviation correction calculation section 11a, and calculates the number of valid packets included in the valid packet sending period.

Figure 6:
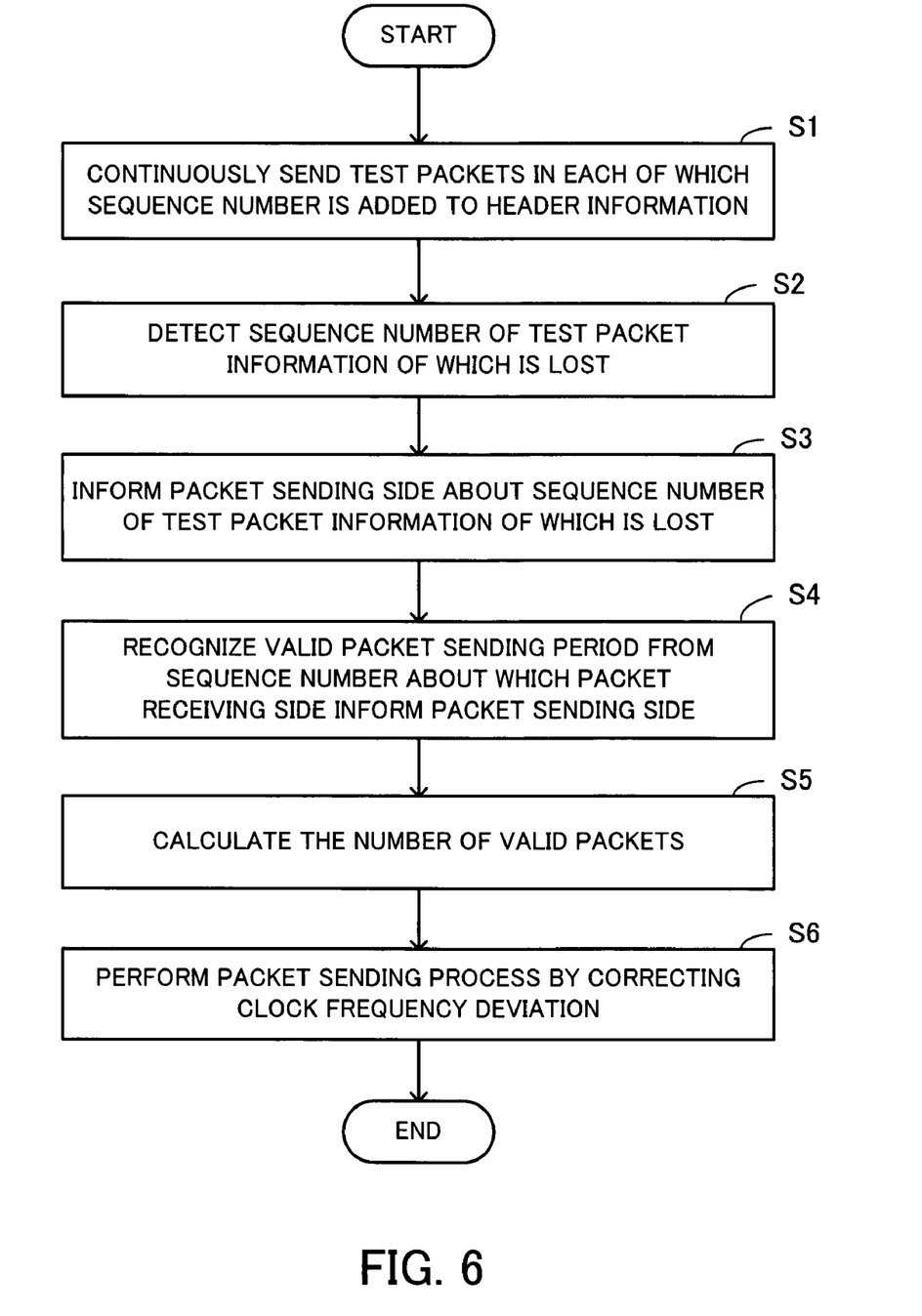
FIG. 6 is a flowchart showing the operation of the packet transmission system according to the present invention.

The operation of the packet transmission system 1 will now be described. FIG. 6 is a flowchart showing the operation of the packet transmission system 1.

[S1] At the beginning of system operation the test packet sending section 13 generates test packets in each of which a sequence number is added to header information, and continuously sends the test packets to the packet receiving apparatus 20a.

[S2] The packet information loss detection section 21 continuously receives the test packets in each of which a sequence number is added to header information, and detects a sequence number of a test packet information of which is lost due to clock frequency deviation.

[S3] The notification section 22 informs the packet sending apparatus 10a about the sequence number of the test packet the information of which is lost.

[S4] The clock frequency deviation correction calculation section 11a recognizes a valid packet sending period where valid packets information of which is not lost exist, from the sequence number about which the packet receiving apparatus 20a informs the clock frequency deviation correction calculation section 11a.

For example, it is assumed that the sequence number about which the packet receiving apparatus 20a informs the clock frequency deviation correction calculation section 11a is n. Then first through (n−1)th packets are valid packets information of which is not lost. Therefore, the clock frequency deviation correction calculation section 11a recognizes the interval between the head of the first packet and the end of the (n−1)th packet as a valid packet sending period.

[S5] The clock frequency deviation correction calculation section 11a calculates the number of valid packets included in the valid packet sending period. That is to say, the interval between the head of the first packet and the end of the (n−1)th packet is converted into the number of clocks. The number of clocks is treated as a valid packet sending period (corresponding to "4,999" in equation (2)). The number of bits included in one packet is known (m). By substituting these values in equation (2), the number of the valid packets can be calculated.

[S6] The packet sending section 12 exercises priority control by determining whether a packet to be sent is a priority packet or a non-priority packet and by sending a priority packet in preference to a non-priority packet. At this time the packet sending section 12 performs a packet sending process on a packet to be corrected other than the valid packets completely included in the valid packet sending period at the time of correcting the clock frequency deviation by inserting a packet gap corresponding to a sending stop period (that is to say, the packet sending section 12 performs the operation described in the above first, second, or third embodiment).

As stated above, the packet sending apparatus 10a continuously sends the test packets in each of which a sequence number is added to header information to the packet receiving apparatus 20a at the beginning of system operation. The packet receiving apparatus 20a informs the clock frequency deviation correction calculation section 11a about the sequence number of the test packet the information of which is lost. The clock frequency deviation correction calculation section 11a recognizes the valid packet sending period from the sequence number of the test packet the information of which is lost. As a result, the clock frequency deviation correction calculation section 11a can calculate the number of the valid packets.

As has been described in the foregoing, in the present invention sending adjustment is made before priority packet sending to prevent loss of packet information corresponding to clock frequency deviation. As a result, loss of priority packet information caused by clock frequency deviation between sending and receiving apparatus can be avoided. In the above descriptions the length of each packet is m bits, that is to say, each packet has fixed length. If variable-length packets are used, then the following process should be performed. The length of a valid packet should be calculated by using Σm. In addition, a remainder of b (bits) is set to a value smaller than or equal to the maximum value of packet length.

The packet sending apparatus according to the present invention calculates a valid packet sending period in which valid packets packet information of which is not lost are included and the number of valid packets included in the valid packet sending period, and performs a packet sending process on a packet to be corrected other than the valid packets completely included in the valid packet sending period at the time of correcting clock frequency deviation by inserting a packet gap corresponding to a period for which packet sending is stopped to prevent loss of packet information. As a result, it is possible to prevent loss of packet information caused by clock frequency deviation, while minimizing a reduction in transmission rate. Therefore, packet transmission quality can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet sending apparatus for performing packet sending, the apparatus comprising:
   a clock frequency deviation correction calculation section to calculate a valid packet sending period and a number of the valid packets included in the valid packet sending period, wherein the valid packets have packet information; and
   a packet sending section to exercise priority control by determining whether a packet to be sent is a priority packet or a non-priority packet and by sending a priority packet in preference to a non-priority packet, and to perform a packet sending process on a timing of a packet to be corrected other than the valid packets completely included in the valid packet sending period at the time of correcting the clock frequency deviation by inserting a packet gap corresponding to a sending stop period for which packet sending is stopped to prevent loss of packet information,
   wherein:
   when a transmission clock frequency of the packet sending apparatus and the packet receiving apparatus is k Hz, clock frequency deviation of the packet sending apparatus is f parts per million, and clock frequency deviation of the packet receiving apparatus is g p.p.m., the clock frequency deviation correction calculation section calculates an interval L clk in which loss of s-bit data occurs due to clock frequency deviation by using $L=k/[(f-g)\times 10^{-6}]$;
   when a number of bits included in one packet is m and a receiving buffer for changing a clock to be used is not located on a receiving side, the clock frequency deviation correction calculation section calculates a quotient of $(L-s)/m$ as the number of the valid packets included in the valid packet sending period; and
   the packet sending section performs the packet sending process on the timing of the packet to be corrected at the time of correcting the clock frequency deviation by inserting the packet gap corresponding to an s-bit sending stop period.

2. The packet sending apparatus according to claim 1, wherein when the number of the valid packets included in the valid packet sending period is a, then the packet sending section inserts the packet gap corresponding to the sending stop period before an (a+1)th packet to be corrected.

3. A packet sending apparatus for performing packet sending, the apparatus comprising:
   a clock frequency deviation correction calculation section to calculate a valid packet sending period and a number of the valid packets included in the valid packet sending period, wherein the valid packets have packet information; and
   a packet sending section to exercise priority control by determining whether a packet to be sent is a priority packet or a non-priority packet and by sending a priority packet in preference to a non-priority packet, and to perform a packet sending process on a timing of a packet to be corrected other than the valid packets completely included in the valid packet sending period at the time of correcting the clock frequency deviation by inserting a packet gap corresponding to a sending stop period for which packet sending is stopped to prevent loss of packet information,
   wherein:
   when a transmission clock frequency of the packet sending apparatus and the packet receiving apparatus is k Hz, clock frequency deviation of the packet sending apparatus is f parts per million, and clock frequency deviation of the packet receiving apparatus is g p.p.m., the clock frequency deviation correction calculation section calculates an interval L clk in which loss of s-bit data occurs due to clock frequency deviation by using $L=k/[(f-g)\times^{-6}]$;
   when a number of bits included in one packet is m and a receiving buffer for receiving data corresponding to αclocks and changing a clock to be used is located on a receiving side, the clock frequency deviation correction calculation section calculates a quotient of $((L-s)+\alpha)/m$ as the number of the valid packets included in the valid packet sending period; and
   the packet sending section performs the packet sending process on the timing of the packet to be corrected at the time of correcting the clock frequency deviation by inserting the packet gap corresponding to an s-bit sending stop period.

4. The packet sending apparatus according to claim 3, wherein when the number of the valid packets included in the valid packet sending period is a, then the packet sending section inserts the packet gap corresponding to the sending stop period before an (a+1)th packet to be corrected.

5. A packet sending apparatus for performing packet sending, the apparatus comprising:

a clock frequency deviation correction calculation section to calculate a valid packet sending period and a number of the valid packets included in the valid packet sending period, wherein the valid packets have packet information; and a packet sending section to exercise priority control by determining whether a packet to be sent is a priority packet or a non-priority packet and by sending a priority packet in preference to a non-priority packet, and to perform a packet sending process on a timing of a packet to be corrected other than the valid packets completely included in the valid packet sending period at the time of correcting the clock frequency deviation by inserting a packet gap corresponding to a sending stop period for which packet sending is stopped to prevent loss of packet information, wherein:

when a transmission clock frequency of the packet sending apparatus and the packet receiving apparatus is k Hz, clock frequency deviation of the packet sending apparatus is f parts per million, and clock frequency deviation of the packet receiving apparatus is g p.p.m., the clock frequency deviation correction calculation section calculates an interval L clk in which loss of s-bit data occurs due to clock frequency deviation by using $L=k/[(f-g)\times 10^{-6}]$;

when a number of bits included in one packet is m, the clock frequency deviation correction calculation section calculates a quotient of $(L-s)+\alpha)/m$ as a first number of valid packets included in the valid packet sending period;

when a receiving buffer for receiving data corresponding to $\alpha$ clocks and changing a clock to be used is located on a receiving side, the clock frequency deviation correction calculation section calculates a quotient of $((L-s)+\alpha)/m$ as a second number of valid packets included in the valid packet sending period;

when the second number of the valid packets is c, then the packet sending section inserts the packet gap corresponding to the sending stop period before a (c+1)th packet to be corrected in a period corresponding to the $\alpha$ clocks; and when the first number of the valid packets is a, then the packet sending section inserts the packet gap corresponding to the sending stop period before an (a+1)th packet to be corrected, after elapse of the period corresponding to the $\alpha$ clocks.

6. The packet sending apparatus according to claim 5, wherein:

when the packet sending section sends first through Nth priority packets, the packet sending section inserts the packet gap corresponding to the sending stop period before the first priority packet sent at the beginning of operation; and when the packet sending section first sends a Kth (1<K<N) priority packet after elapse of the valid packet sending period, the packet sending section inserts the packet gap corresponding to the sending stop period before the Kth priority packet.

7. The packet sending apparatus according to claim 5, wherein:

the packet sending section continuously sends all of the valid packets included in the valid packet sending period as priority packets;

when the packet sending section sends a first priority packet after elapse of the valid packet sending period, the packet sending section inserts the packet gap corresponding to the sending stop period before the first priority packet; and the packet sending section continuously sends all of the valid packets again as priority packets for the valid packet sending period from beginning of the first priority packet.

8. A packet transmission system for performing packet transmission between a packet sending apparatus and a packet receiving apparatus between which clock frequency deviation exists, the system comprising:

a first packet unit including:

a packet information loss detection section to receive test packets continuously in each of which a sequence number is added to header information, and f to detect a sequence number of a test packet information of which is lost due to the clock frequency deviation, and a notification section to inform other end about the sequence number of the test packet the information of which is lost; and a second packet unit including a test packet sending section to send the test packets continuously in each of which the sequence number is added to the header information at the beginning of operation, a clock frequency deviation correction calculation section to recognize a valid packet sending period, and to calculate a number of the valid packets included in the valid packet sending period, wherein the valid packets have packet information, and a packet sending section to exercise priority control by determining whether a packet to be sent is a priority packet or a non-priority packet and by sending a priority packet in preference to a non-priority packet, and to perform a packet sending process on a timing of a packet to be corrected other than the valid packets completely included in the valid packet sending period at the time of correcting the clock frequency deviation by inserting a packet gap corresponding to a sending stop period for which packet sending is stopped to prevent loss of packet information, wherein:

when a transmission clock frequency of the first packet unit and the second packet unit is k Hz, clock frequency deviation of the second packet unit is f parts per million and clock frequency deviation of the first packet unit is g p.p.m., the clock frequency deviation correction calculation section calculates an interval L clk in which loss of s-bit data occurs due to clock frequency deviation by using $L=k/[(f-g)\times 10^{-6}]$;

when a number of bits included in one packet is m and a receiving buffer for changing a clock to be used is not located on a receiving side, the clock frequency deviation correction calculation section calculates a quotient of (L-s)/m as the number of the valid packets included in the valid packet sending period; and the packet sending section performs the packet sending process on the packet to be corrected at the time of correcting the clock frequency deviation by inserting the packet gap corresponding to an s-bit sending stop period.

9. The packet sending apparatus according to claim 1, wherein:

when the packet sending section sends first through Nth priority packets, the packet sending section inserts the packet gap corresponding to the sending stop period before the first priority packet sent at the beginning of operation; and when the packet sending section first sends a Kth (1<K<N) priority packet after elapse of the valid packet sending period, the packet sending section inserts the packet gap corresponding to the sending stop period before the Kth priority packet.

10. The packet sending apparatus according to claim 1, wherein:

the packet sending section continuously sends all of the valid packets included in the valid packet sending period as priority packets;

when the packet sending section sends a first priority packet after elapse of the valid packet sending period, the packet sending section inserts the packet gap corresponding to the sending stop period before the first priority packet; and the packet sending section continuously sends all of the valid packets again as priority packets for the valid packet sending period from beginning of the first priority packet.

11. The packet sending apparatus according to claim 3, wherein:

when the packet sending section sends first through Nth priority packets, the packet sending section inserts the packet gap corresponding to the sending stop period before the first priority packet sent at the beginning of operation; and when the packet sending section first sends a Kth (1<K<N) priority packet after elapse of the valid packet sending period, the packet sending section inserts the packet gap corresponding to the sending stop period before the Kth priority packet.

12. The packet sending apparatus according to claim 3, wherein:

the packet sending section continuously sends all of the valid packets included in the valid packet sending period as priority packets;

when the packet sending section sends a first priority packet after elapse of the valid packet sending period, the packet sending section inserts the packet gap corresponding to the sending stop period before the first priority packet; and the packet sending section continuously sends all of the valid packets again as priority packets for the valid packet sending period from beginning of the first priority packet.

13. The packet sending apparatus according to claim 5, wherein when the number of the valid packets included in the valid packet sending period is a, then the packet sending section inserts the packet gap corresponding to the sending stop period before an (a+1)th packet to be corrected.

* * * * *